United States Patent
Chen et al.

(10) Patent No.: US 6,852,358 B1
(45) Date of Patent: Feb. 8, 2005

(54) PROCESS FOR PREPARING AN OPTICAL WAVEGUIDE COMPONENT FROM ACRYLATE/TITANIUM ALKOXIDE COMPOSITE MATERIAL AND THE PREPARED OPTICAL WAVEGUIDE COMPONENT

(75) Inventors: Wen Chang Chen, Taipei (TW); Long Hua Lee, Taipei (TW)

(73) Assignee: Chang Chun Plastics Co., Ltd., Taipei (TW)

(*) Notice: Subject to any disclaimer, the term of this patent is extended or adjusted under 35 U.S.C. 154(b) by 0 days.

(21) Appl. No.: 10/649,676

(22) Filed: Aug. 28, 2003

(51) Int. Cl.$^7$ ............................... B05D 5/06; G02B 6/10
(52) U.S. Cl. ................. 427/163.2; 427/271; 427/372.2; 427/379; 427/402; 385/131; 385/132; 385/142; 385/144
(58) Field of Search ................................ 427/552, 555, 427/163.2, 271, 372.2, 379, 402; 385/129, 130, 131, 132, 142, 143, 144, 145; 430/322, 323, 324; 216/24, 39

(56) References Cited

U.S. PATENT DOCUMENTS

| | | | | |
|---|---|---|---|---|
| 5,783,319 A | * | 7/1998 | Reisfeld et al. | 428/690 |
| 6,144,795 A | * | 11/2000 | Dawes et al. | 385/141 |
| 6,492,540 B1 | * | 12/2002 | Su et al. | 556/30 |
| 2003/0165710 A1 | * | 9/2003 | Kuramoto et al. | 428/689 |
| 2003/0195321 A1 | * | 10/2003 | Zha | 528/10 |
| 2003/0228120 A1 | * | 12/2003 | Kuramoto et al. | 385/132 |
| 2004/0008960 A1 | * | 1/2004 | Rantala | 385/129 |
| 2004/0033309 A1 | * | 2/2004 | Fardad et al. | 427/162 |
| 2004/0071426 A1 | * | 4/2004 | Etienne | 385/129 |

* cited by examiner

Primary Examiner—Shrive P. Beck
Assistant Examiner—Wesley D. Markham
(74) Attorney, Agent, or Firm—Bacon & Thomas (57) ABSTRACT

The present invention relates to a process for preparing an optical waveguide component from acrylate/titanium alkoxide composite material, which is characterized by using an acid-free sol-gel process to prepare a precursor solution of acrylate/titanium alkoxide composite film, then coating the precursor solution on a silicon wafer then drying, and producing the optical waveguide component having channels by using a lithography process. The present invention also relates to an optical waveguide component of acrylate/titanium alkoxide composite material, the material has excellent transparency and its refractive index varies with the amount of titanium alkoxide contained therein. When an optical waveguide component is prepared from the composite the reduction of near-infrared ray is less than 0.7 dB/cm and therefore the waveguide component is advantageous for use as an optical communication element.

11 Claims, 6 Drawing Sheets

PROCESS FOR PREPARING AN OPTICAL WAVEGUIDE COMPONENT FROM ACRYLATE/TITANIUM ALKOXIDE COMPOSITE MATERIAL AND THE PREPARED OPTICAL WAVEGUIDE COMPONENT

FIELD OF THE INVENTION

The present invention relates to a process for preparing an optical waveguide component and The Prepared Optical Waveguide Component and the prepared optical waveguide component.

BACKGROUND OF THE INVENTION

Optical waveguide component is a necessary component for optical communication coupler and splitter. A structure of such optical waveguide component comprises a core layer and an outer layer in which a refraction index of the core layer is larger than the outer layer, thereby light can transmit through a full reflection.

Conventionally, the optical waveguide component is prepared from silicon dioxides material by Chemical Vapor Deposition (CVD), Flame Hydrolysis Deposition (FHD), Vacuum Deposition (VD), Sputtering method, or Spin-on Glass (SOG) methods to form an optical communication waveguide material. To adjust a refractive index of the silicon dioxides as a core layer or as an outer layer, the silicon dioxide is usually doped with minor amount of other oxide such as titanium dioxide. However, preparation of the waveguide material by CVD, FHD, VD, and Sputtering method is high cost since the used equipment is complicated. Also, a waveguide material prepared from pure inorganic silicon dioxide by Spin-on Glass (SOG) method encounters with a problem of insufficient thickness. Recently, since optical communication elements have been demanded increasingly, a waveguide component based on polymeric material has been paid attention due to its low cost and easily processing. Some polymeric materials have been proposed in many patents publication, such as acrylates (U.S. Pat. No. 5,062,680), polyimide (U.S. Pat. Nos. 5,108,201; 5,572,619; 5,598,501; and 5,659,648), polysiloxane (U.S. Pat. No. 5,972,516) etc. However, a carbon-hydrogen bond vibration energy of the polymeric material will be lost largely at wavelengths of 1310 nm and 1550 nm which are the wavelengths of light source used in current optical communication, therefore application of the optical waveguide component is greatly limited. An improved proposal has been proposed that use of a fluorinated polymeric material such as fluorinated acrylate and fluorinated polyimide could reduce its light-transmission loss due to a carbon-fluorine bond substituting for the carbon-hydrogen bond present in polymeric material. However, a fluorinated monomer is expensive and its synthesis is difficult, which in turn limits the application of the fluorinated polymeric material in waveguide field. Furthermore, disadvantages of the fluorinated polymeric optical waveguide component are directed to its insufficient heat-resistance and mechanical property. Therefore it is difficult to prepare a channel waveguide from such a fluorinated polymeric material.

Under the above circumstances, the present inventors have conducted an investigation on a composite film to resolve the problems in question, and found that an optical film of acrylate/titanium alkoxide having high light transmittance and flatness can be prepared by combining acid-free catalytic solgel method, polymerization, coating, and multistage baking. Also, due to its low optical transmittance loss, it can further be processed into optical waveguide component.

SUMMARY OF THE INVENTION

One object of the present invention is to provide a process for preparing an optical waveguide component from acrylate/titanium alkoxide composite material.

Another object of the present invention is to provide an optical waveguide component from acrylate/titanium alkoxide composite material prepared by the process according to present invention.

DETAILED DESCRIPTION OF THE INVENTION

The present invention relates to a process for preparing an optical waveguide component from acrylate/titanium alkoxide composite material, which comprises the following steps: (a) reacting acrylate with titanium alkoxide in the presence of silicon coupling agent and water by an acid-free sol-gel method to form a precursor solution of an acrylate/titanium alkoxide composite material; (b) coating the resultant precursor solution on a silicon chip on which a silicon dioxide has been previous coated, and then evaporating solvent from the solution at a temperature of from 50 to 200° C., preferably from 140 to 160° C., more preferably from 145 to 155° C. to form a acrylate/titanium alkoxide composite material film; (c) forming a channel on the resultant film by lithographic method; (d) repeating the step (a) except using a ratio of acrylate and titanium alkoxide different from that used in step (a) to form a precursor solution having a refractive index less than the precursor solution obtained from step (a); and (e) applying the precursor solution obtained in step (d) on the composite material film having channels in step (c), evaporating solvent at a temperature of from 70 to 90° C., preferably from 50 to 70° C., and more preferably from 55 to 65° C., and then baking at a temperature of from 50 to 200° C., preferably from 140 to 160° C., and more preferably from 145 to 155° C., to produced produce the optical waveguide component of acrylate/titanium alkoxide composite material according to the present invention.

Figure 1:
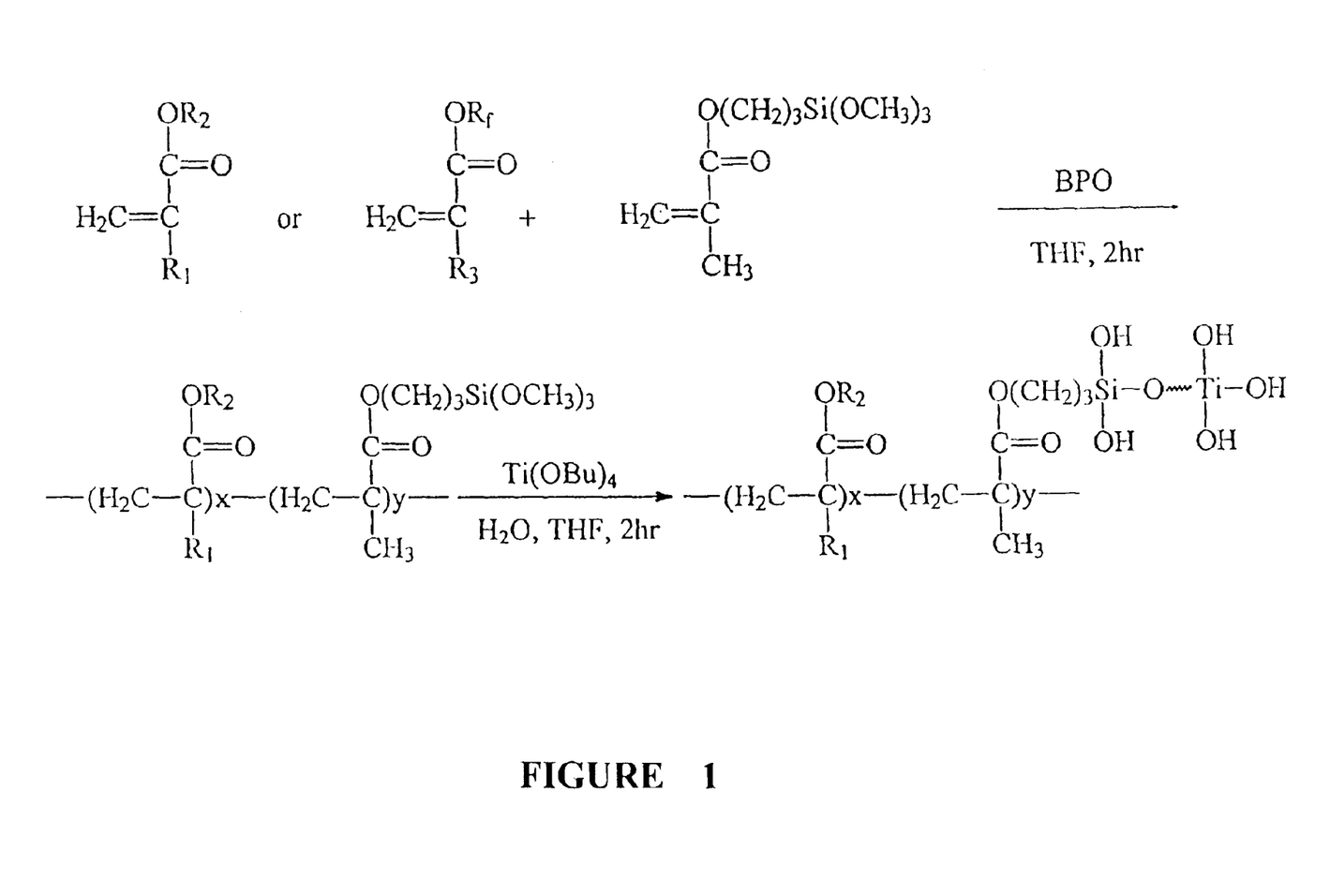
FIG. 1 is a reaction scheme for preparing the precursor solution of acrylate/titanium alkoxide composite material according to the process of the present invention.

The reaction according to the process of the present invention is illustrated by a reaction scheme as shown in FIG. 1.

The term "acrylate" used herein refers to acrylate and methacrylate and a combination thereof.

In the steps (a) and (d) for producing the precursor solution according to the process of the present invention, a mole ratio of the coupling agent to total moles of the acrylate monomer and the coupling agent is from 0.1 to 0.5. If the mole ratio of the coupling agent to total mole of the acrylate monomer and the coupling agent is less than 0.1, the acrylate and the titanium alkoxide are easily subjected to self-polymerization causing phase-separation. If the mole ratio of the coupling agent to total moles of the acrylate monomer and the coupling agent is more than 0.5, the coupling agent is easily subjected to self-polymerization. Both the mole ratio less than 0.1 and more than 0.5 will cause large light scattering loss and is not suitable for application in optical communication field.

Since we do not use acid catalyst in the steps (a) and (d) for producing the precursor solution according to the process of the present invention, a precipitation of titanium alkoxide resulting from its fast reaction could be avoided. In the steps (a) and (d) for producing the precursor solution according to the process of the present invention, a mole ratio of water to titanium alkoxide is preferably from 0.5 to 1.5, and the amount of titanium alkoxide is 1 to 90% by weight based on the weight of the precursor solution. The acrylate used in the steps (a) and (d) for producing the precursor solution according to the process of the present invention is one or more acrylate selected from formula $CH_2C(R_1)COOR_2$ and $CH_2C(R_3)COOR_f$, in which $R_1$, $R_2$, and $R_3$ independently represent a $C_{1-12}$ alkyl group or a $C_{3-12}$ cycloalkyl group, and $R_f$ represents a $C_{1-4}$ haloalkyl group.

The term "$C_{1-12}$ alkyl group" used herein refers to a straight or branched alkyl group containing 1 to 12 carbon atoms, such as methyl, ethyl, n-propyl, isopropyl, n-butyl, isobutyl, t-butyl, n-pentyl, hexyl, heptyl, octyl, nonyl, decyl, undecyl, and dodecyl etc.

The term "$C_{3-12}$ cycloalkyl" used herein refers to a mono- and multi-cyclic alkyl group containing 3 to 12 carbon atoms, such as cyclopropyl, cyclobutyl, cyclopentyl, methyl-cyclopentyl, cyclohexyl, methyl-cyclohexyl, cycloheptyl, methyl-cycloheptyl, cyclooctyl, methyl-cyclooctyl, adamantanyl, etc.

The term "$C_{1-6}$ haloalkyl group" used herein refers to a straight or branched $C_{1-4}$ alkyl group substituted with one or more halogen atoms. The halogen atom refers to a fluorine, a chlorine, a bromine, and iodine atom Examples of the acrylate include, but not limited to, methyl acrylate, methyl methacrylate, ethyl acrylate, ethyl methacrylate, propyl acrylate, propyl methacrylate, butyl acrylate, butyl methacrylate, cyclohexyl acrylate, cyclohexyl methacrylate, bornyl acrylate, bornyl methacrylate, isobornyl acrylate, isobornyl methacrylate, adamantanyl acrylate, adamantanyl methacrylate, trifluoromethyl acrylate, trifluoromethyl methacrylate, hexafluoropropyl acrylate, hexafluoropropyl methacrylate, and a combination thereof.

The titanium alkoxide used in the steps (a) and (d) for producing the precursor solution according to the process of the present invention includes, but not limited to, titanium tetra-n-butoxide ($Ti(n-BuO)_4$).

The coupling agent used in the steps (a) and (d) for producing the precursor solution according to the process of the present invention includes a silicon coupling agent having the following formula:

$$(CH_2=CR-COOR_4)_x-Si(OR)_{4-x}$$

wherein R represents a $C_{1-6}$ alkyl group, $R_4$ represents a $C_{1-6}$ alkylene group, and x represents an integer of from 1 to 4.

The term "$C_{1-6}$ alkyl group" used herein refers to a straight or branched alkyl group containing 1 to 6 carbon atoms, such as methyl, ethyl, n-propyl, isopropyl, n-butyl, isobutyl, t-butyl, n-pentyl, neopentyl, hexyl, etc. The term "$C_{1-6}$ alkylene group" used herein refers to a divalent group obtained by detracting a hydrogen atom from the $C_{1-6}$ alkyl group defined above.

Examples of the silicon coupling agent include, but not limit to, 2-trimethoxysitylethyl methacrylate, 2-trimethoxysilylethyl acrylate, 2-triethoxysilylethyl methacrylate, 2-triethoxysilylethyl acrylate, 3-trimethoxysilylpropyl methacrylate, 3-trimethoxysilylpropyl acrylate, 3-triethoxysilylpropyl methacrylate, 3-triethoxysilylpropyl acrylate, 4-trimethoxysilylbutyl methacrylate, 4-trimethoxysilylbutyl acrylate, 4-triethoxysilylbutyl methacrylate, 4-triethoxysilylbutyl acrylate, etc.

To obtain an excellent uniformity of the precursor solution, the acid-free sol-gel reaction in steps (a) and (d) according to the present invention is preferably carried out in an inert solvent which is capable of dissolving the reactants but incapable of reacting with reactants. Examples of the inert solvent includes, but not limits to, monohydric alcohols or glycols, such as methanol, ethanol, propanol, isopropanol, butanol, ethylene glycol, propylene glycol, hexylene glycol, and octylene glycol; ethers, such as methoxy ethanol, ethoxy ethanol, ethoxy propanol, ethoxy butanol, methoxy propanol, propoxy ethanol, ethylene glycol diethyl ether, propylene glycol dimethyl ether, methoxy diethylene glycol, propoxy diethylene glycol, ethoxy diethylene glycol, methoxy diethylene glycol, diethylene glycol dimethyl ether, diethylene glycol diethyl ether, dipropylene glycol dimethyl ether, dipropylene glycol diethyl ether, tetrahydrofurane, and the like; ketones, such as acetone, methyl ethyl ketone, and methyl propyl ketone, methyl isobutyl ketone, and the like.

The polymerization in steps (a) and (d) for producing the precursor solution according to the process of the present invention are conveniently carried out at a temperature below 70° C., preferably below 60° C. for 30 minutes to 4 hours, preferably 1 to 2 hours.

The polymerization in the steps (a) and (d) for producing the precursor solution according to the process of the present invention are conveniently carried out in the presence of a thermal initiator. Examples of the thermal initiator include 2,2-azobisisobutyronitrile, benzoyl peroxide, acetyl peroxide, lauroyl peroxide, etc. The amount of the thermal initiator added in to the reaction is from 0.001 to 0.1% by weight based on total weight of the thermal initiator and the acrylates monomer.

In the steps (a) and (d) for producing the precursor solution according to the process of the present invention, the reaction is preferably carried out in an inert atmosphere such as purge of nitrogen and the generated alcohols are simultaneously blown out from the system due to the following reasons: (1) oxygen and water will cause titanium alkoxide gel particle contained in the reaction system to aggregate and become unstable, (2) oxygen and water will cause excessive hydrolysis resulting in gelling, and (3) the alcohol generated during hydrolysis, if its amount is too large, will cause film's drying and shrinkage too fast and then cause the dried film broken.

The steps (b) and (c) for coating the precursor solution on a silicon chip according to the process of the present invention are carried out by any coating method well known in the art, including, for example, rolling coating, flow coating, dip coating, spray coating, spin coating, and curtain coating. Among them, the spin coating is preferred.

The lithographic method used in step (c) of the present process is performed by using g- or i-line source. A photoresist could be a positive or a negative photoresist. Also, the lithography is carried out by either dry or wet etching method, or both.

The present invention will be illustrated by reference to the following non-limited examples. However, the examples are only for illustration purpose but not intended to limit the scope of the present invention.

EXAMPLE 1

Into a three-necked bottle equipped with a condenser was charged with 3.0036 g of methyl methacrylate (MMA), 2.4835 g of 3-(trimethoxysilyl)-propyl methacrylate (MSMA), and 20 g of tetrahydrofuran (THF). Separately, 0.4845 g of benzoyl peroxide (BOP, an initiator) was dissolved in 10 g of tetrahydrofuran. The resultant benozyl peroxide in tetrahydrofuran solution was then added into the content in the above three-necked bottle and a polymerization was carried out at 60° C. The condenser was used for preventing the solvent from evaporation. During the polymerization, nitrogen gas was continuously purged into the bottle to assure that no oxygen or moisture was contained in the reaction system. The reaction continued for 2 hours at that temperature.

Separately, 3.6581 g of titanium tetra-n-butoxide (Ti ("OBu)$_4$) was dissolved in 15 g of tetrahydrofuran and 0.0729 g of de-ionized water was dissolved in 11 g of tetrahydrofuran. The resultant tetrahydrofuran solution containing titanium tetra-n-butoxide and the tetrahydrofuran solution containing de-ionized water were separately dropwise added into the above reaction mixture at 60° C. over a period of 2 hours. After reacting for 2 hours, the reaction mixture was remained as liquid without gelling. The reaction mixture was then concentrated under reduced pressure to give a precursor solution of acrylate/titanium alkoxide composite material.

Figure 3:
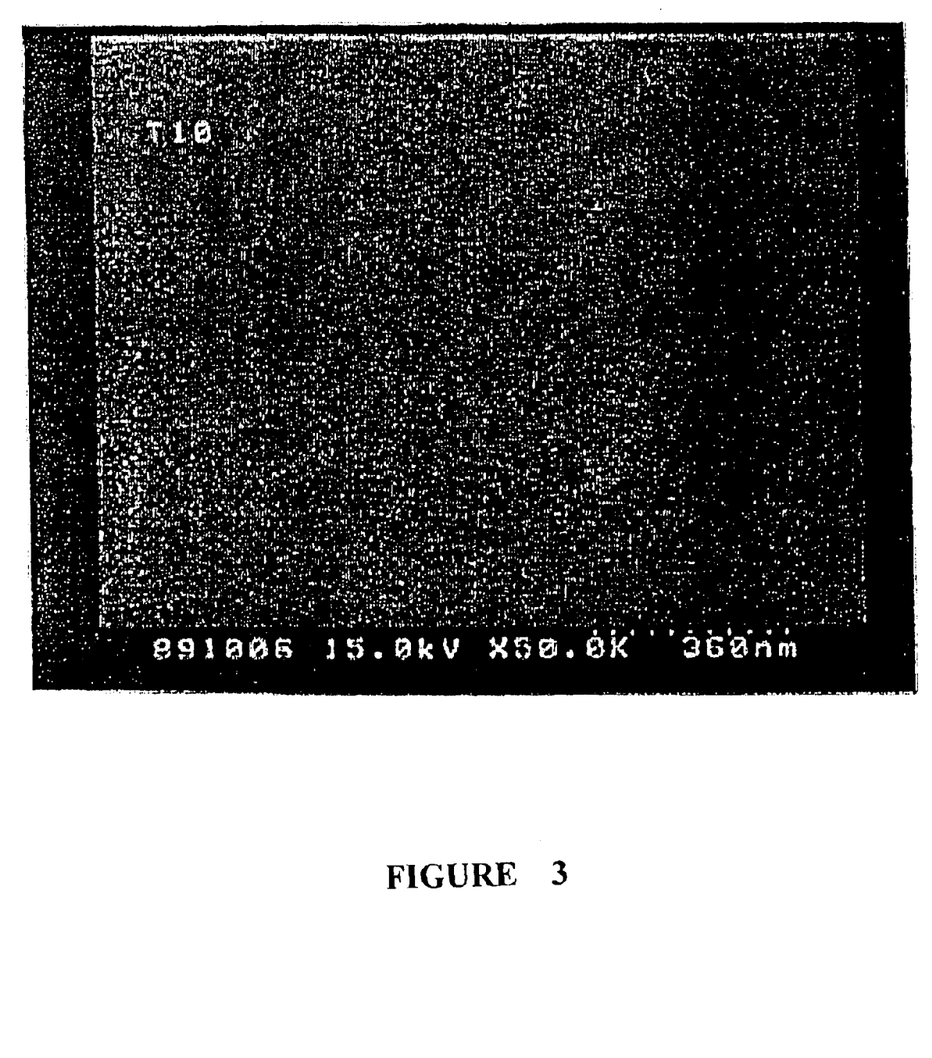
FIG. 3 is a Field Emitting Scanning Electromicroscopic (FE-SEM) photo of the optical film prepared from Example 1 according to the present invention.
Figure 4:
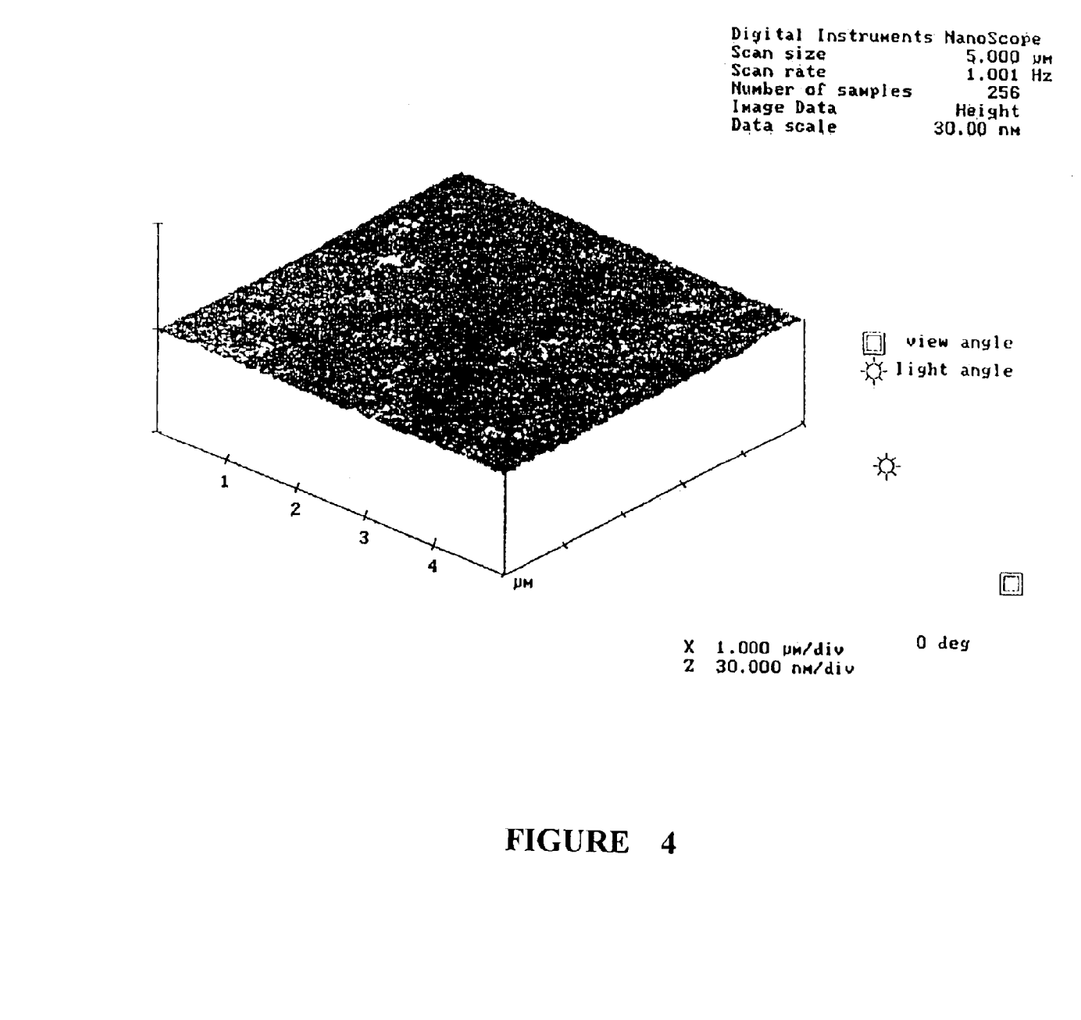
FIG. 4 is an Atomic Force Microscopic (AFM) photo of the optical film prepared from Example 1 according to the present invention.

The precursor solution of acrylate/titanium alkoxide composite material was then spin coated on a silicon wafer at 3,000 rpm for 40 seconds and then backed at 80° C. for 1 hour and at 150° C. for 1 hour to give a optical film of acrylate/titanium alkoxide composite material. A field emitting scanning electromicroscopic photo of the resultant optical film is shown in FIG. 3. From the FIG. 3, it is known that size of the titanium alkoxide contained in the optical film is very small as below 10 nanometer. A atomic force microscopic photo of the resultant optical film is shown in FIG. 4, which shows that a thickness of the film is 1.5 micro-meter and average roughness and average square root roughness are both less than 1 nanometer. It is known that the composite optical film of the present invention has excellent flatness. The refractive index of the composite optical film is measured by prism coupler meter as 1.5604 (1319 nm).

EXAMPLES 2–6

Figure 5:
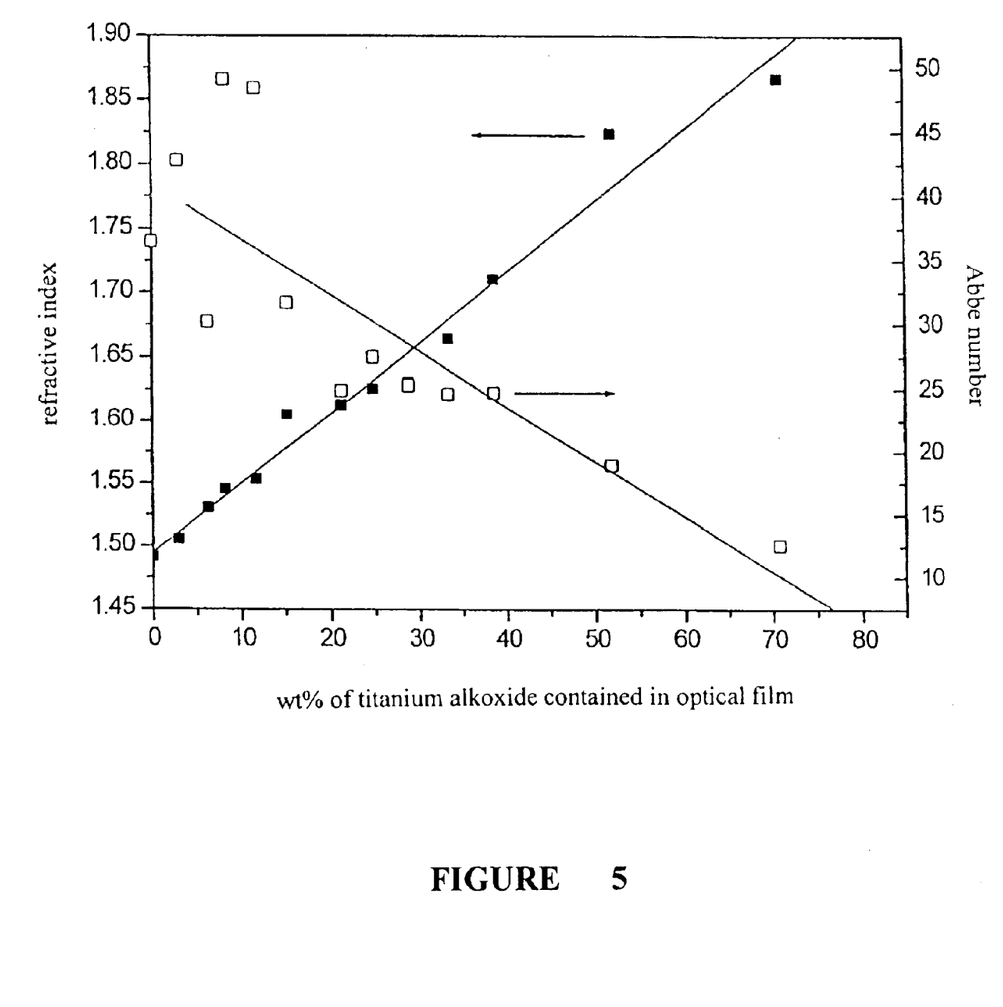
FIG. 5 is a plot of the refractive index of the optical films prepared from Example 16 vs. the amount of titanium alkoxide contained therein.

The procedures of Example 1 was followed except changing the amount of titanium alkoxide to obtain optical films of acrylate/titanium alkoxide composite material having various refractive index. A plot of the refractive index of the optical films vs. the amount of titanium alkoxide contained therein is shown in FIG. 5. From FIG. 5, it is known that refractive index of the optical film is in directly proportion to the amount of titanium alkoxide contained therein. Also, the resultant optical film possesses an excellent flatness and light transmittance, and thus is useful in preparing optical waveguide.

EXAMPLE 7

Figure 2:
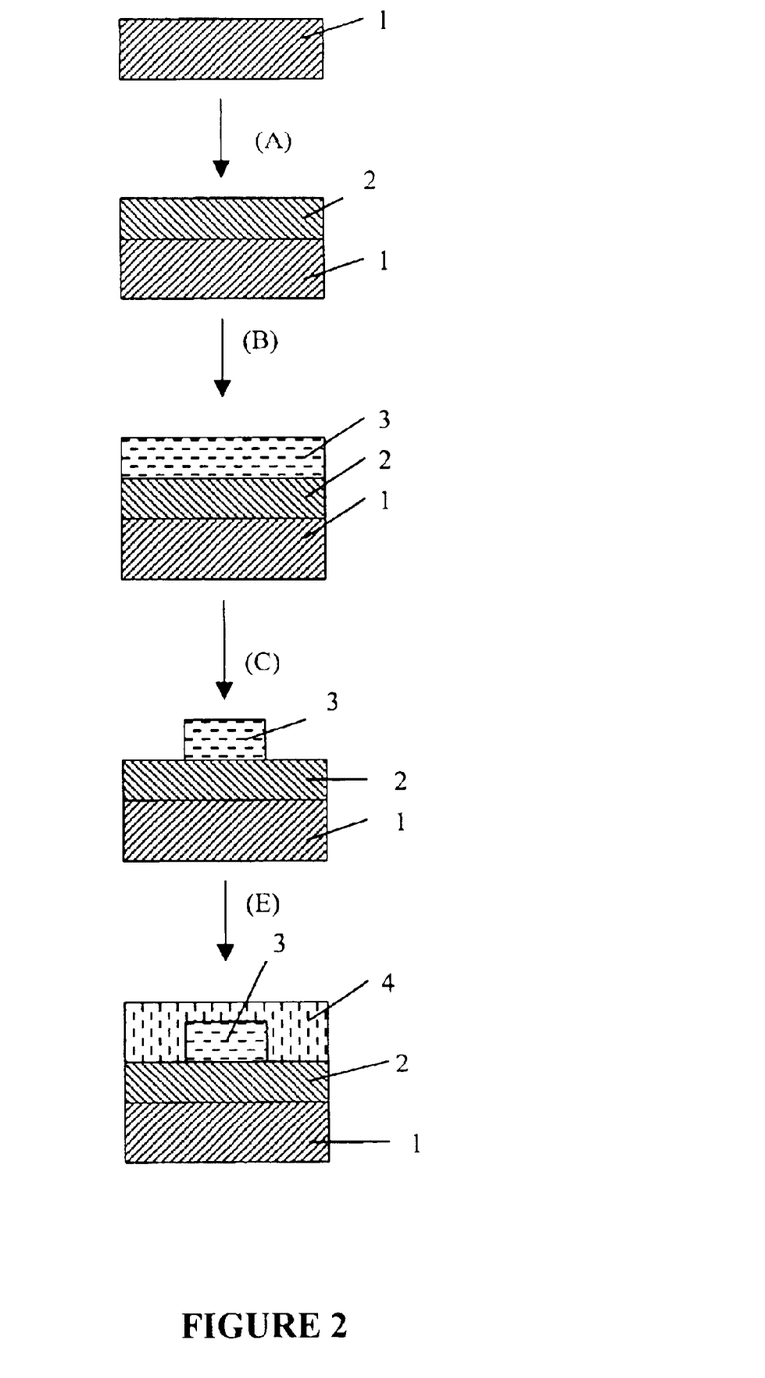
FIG. 2 is a flow chart for preparing an optical waveguide from the acrylate/titanium alkoxide composite material according to the present invention, in which numeral 1 represents silicon wafer, 2 represents silicon dioxide coating, 3 represents an acrylate/titanium alkoxide core layer, 4 represents acrylate/titanium alkoxide outer layer, step (A) represents a silicon dioxide deposition, step (B) represents a spin coating, step (C) represents a lithographic process, and step (E) represents applying a shell layer.
Figure 6:
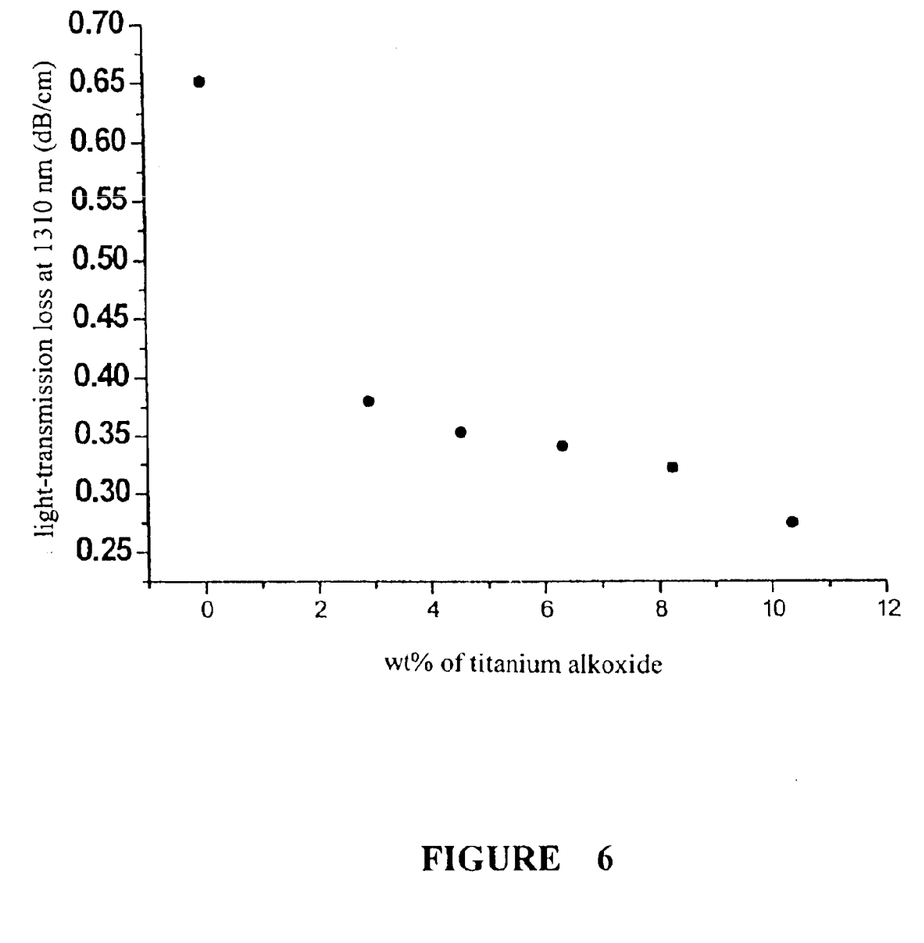
FIG. 6 is a plot of the light-transmission loss of the optical films prepared from Example 1–6 vs. the amount of titanium alkoxide contained therein.

The composite optical films prepared from Examples 1–6 were subjected to lithographic process and dry etching process by using i-line (365 nm) and novolac resin photoresist, as shown in FIG. 2, to obtain an optical waveguide. The resultant optical waveguide was determined its light-transmission loss by cut-back method and found as between 0.3 and 0.5 dB/cm. A plot of light-transmission loss of the optical waveguide vs. the amount of titanium alkoxide contained therein is shown in FIG. 6. From FIG. 6, it is known that the light-transmission loss is decreased with increase of titanium alkoxide. It is because that a density of C—H bond is decreased and particle size of the titanium alkoxide is very small not to affect the light-transmission loss of the optical waveguide. The optical waveguide prepared according to the process of the present invention has achieved the light-requirement transmission loss requirement required by currently optical waveguide component, i.e. less than 1 d B/cm.

The present invention has been illustrated by reference to the above Examples. However, the examples are merely illustrated purpose without limiting the scope of the present invention thereto. Various modification and change is easily attained by those skilled in the art without departing from the spirit and the scope of the present invention.

What is claimed is:

1. A process for preparing an optical waveguide component from acrylate/titanium alkoxide composite material, which comprises the following steps:
   (a) reacting acrylate with titanium alkoxide in the presence of silicon coupling agent and water by an acid-free solgel method to form a precursor solution of an acrylate/titanium alkoxide composite material;
   (b) coating the resultant precursor solution on a silicon chip on which a silicon dioxide has been previous coated, and then evaporating solvent from the solution at a temperature from 50 to 200° C. to form a acrylate/titanium alkoxide composite material film;
   (c) forming a channel on the resultant film by lithographic method;
   (d) repeating the step (a) except using a ratio of acrylate and titanium alkoxide different from that used in step (a) to form a precursor solution having a refractive index less than the precursor solution obtained from step (a); and
   (e) applying the precursor solution obtained in step (d) on the composite material film having channels in step (c), evaporating solvent at a temperature of from 70 to 90° C., and then baking at a temperature of from 50 to 200° C., to produce the optical waveguide component of acrylate/titanium alkoxide composite material.

2. The process according to claim 1, wherein in the steps (a) and (d) the mole ratio of the coupling agent to total mole of the acrylate monomer and the coupling agent is from 0.1 to 0.5.

3. The process according to claim 1, wherein in the steps (a) and (d) the mole ratio of water to the titanium alkoxide is from 0.5 to 1.5.

4. The process according to claim 1, wherein in the steps (a) and (d) the amount of the titanium alkoxide is from 1 to 90% by weight based on the weight of the precursor solution.

5. The process according to claim 1, wherein in the steps (a) and (d) the acrylate monomer is selected from one or more acrylate of formula $CH_2C(R_1)COOR_2$ and $CH_2C(R_3)COOR_f$, in which $R_1$, $R_2$, and $R_3$ independently represent a $C_{1-12}$ alkyl group or a $C_{3-12}$ cycloalkyl group, and $R_f$ represents a $C_{1-6}$ haloalkyl group.

6. The process according to claim 5, wherein the acrylate monomer is selected from the group consisting of methyl acrylate, methyl methacrylate, ethyl acrylate, ethyl methacrylate, propyl acrylate, propyl methacrylate, butyl acrylate, butyl methacrylate, cyclohexyl acrylate cyclohexyl methacrylate, bornyl acrylate, bornyl methacrylate, isobornyl acrylate, isobornyl methacrylate, adamantanyl acrylate, adamantanyl methacrylate, trifluoromethyl acrylate, trifluoromethyl methacrylate, hexafluoropropyl acrylate, hexafluoropropyl methacrylate, and a combination thereof.

7. The process according to claim 1, wherein in the steps (a) and (d) the silicon coupling agent has the following formula:

wherein R represents a $C_{1-6}$ alkyl group, $R_4$ represents a $C_{1-6}$ alkylene group, and x represents an integer of from 1 to 4.

8. The process according to claim 7, wherein the silicon couping agent is selected from the group consisting of 2-trimethoxysilylethyl methacrylate, 2-trimethoxysilylethyl acrylate, 2-triethoxysilylethyl methacrylate, 2-triethoxysilylethyl acrylate, 3-trimethoxysilylpropyl methacrylate, 3-trimethoxysilylpropyl acrylate, 3-triethoxysilylpropyl methacrylate, 3-triethoxysilylpropyl acrylate, 4-trimethoxysilylbutyl methacrylate, 4-trimethoxysilylbutyl acrylate, 4-triethoxysilylbutyl methacrylate, 4-triethoxysilylbutyl acrylate, and a combination thereof.

9. The process according to claim 1, wherein in the steps (a) and (d) the titanium alkoxide is titanium tetra-n-butoxide $(Ti(n-BuO)_4)$.

10. The process according to claim 1, wherein the steps (a) and (d) are carried out in the presence of a thermal initiator.

11. The process according to claim 10, wherein the thermal initiator is selected from the group consisting of 2,2-azobisisobutyronitrile, benzoyl peroxide, acetyl peroxide, lauroyl peroxide, and a combination thereof.

* * * * *